(12) United States Patent
Akiyama et al.

(10) Patent No.: US 9,037,505 B2
(45) Date of Patent: May 19, 2015

(54) MECHANISMS FOR EXECUTING A PROCESS IN A CLOUD COMPUTING ENVIRONMENT

(75) Inventors: Kazuhito Akiyama, Yamato (JP); Kazuo Iwano, Tokyo (JP); Akira Ohkado, Yamato (JP); Tadashi Tsumura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 13/322,529

(22) PCT Filed: May 12, 2010

(86) PCT No.: PCT/JP2010/057991
§ 371 (c)(1), (2), (4) Date: Nov. 25, 2011

(87) PCT Pub. No.: WO2010/137455
PCT Pub. Date: Dec. 2, 2010

(65) Prior Publication Data
US 2012/0072318 A1   Mar. 22, 2012

(30) Foreign Application Priority Data
May 29, 2009   (JP) ................................. 2009-131207

(51) Int. Cl.
*G06F 15/177* (2006.01)
*G06F 15/173* (2006.01)
(Continued)

(52) U.S. Cl.
CPC ............ *G06Q 40/12* (2013.01); *H04L 41/0213* (2013.01); *H04L 29/06* (2013.01); *H04L 29/08144* (2013.01)

(58) Field of Classification Search
CPC ................ H04L 29/06; H04L 41/0213; H04L 29/08144; G06F 9/45533; G06F 9/52
USPC ....................... 709/221, 223, 226; 718/1, 104; 705/26.1, 30
See application file for complete search history.

(56) References Cited

U.S. PATENT DOCUMENTS

2003/0028642 A1* 2/2003 Agarwal et al. ............... 709/226
2005/0021530 A1* 1/2005 Garg et al. ..................... 707/100
(Continued)

FOREIGN PATENT DOCUMENTS

JP   2001-325041 A   11/2001
JP   2002-358290 A   12/2002
(Continued)

OTHER PUBLICATIONS

Simon, R.; Jukic, B.; Woan Sun Chang, "Optimal resource allocation for multi-service networks," Simulation Symposium, 2000. (SS 2000) Proceedings. 33rd Annual , vol., no., pp. 33,41, 2000 doi: 10.1109/SIMSYM.2000.844898.*

*Primary Examiner* — Olusegun Goyea
(74) *Attorney, Agent, or Firm* — Stephen J. Walder, Jr.; Jeffrey S. LaBaw

(57) ABSTRACT

Deterioration of service quality due to shortage of resources and/or increased cost of support due to excessive resources is minimized in the case where the amount of requested services may change in cloud computing. Provided are mechanisms for executing a process specified by a user in a cloud computing environment and charging the user for the process. The mechanisms include a receiving part for receiving an instruction to execute the specified process and a determining part for determining an external resource to provision from a first other computer system for a charge. The mechanisms further comprise an external resource securing part for securing the external resource on the first other computer system and an executing part for causing the external resource to execute at least a part of the specified process.

17 Claims, 12 Drawing Sheets

(51) Int. Cl.
*G06Q 40/00* (2012.01)
*H04L 29/06* (2006.01)
*H04L 12/24* (2006.01)
*H04L 29/08* (2006.01)

(56) References Cited

U.S. PATENT DOCUMENTS

| | | | |
|---|---|---|---|
| 2005/0198231 A1* | 9/2005 | Gasca et al. | 709/221 |
| 2006/0271544 A1* | 11/2006 | Devarakonda et al. | 707/9 |
| 2007/0220520 A1* | 9/2007 | Tajima | 718/104 |
| 2008/0250134 A1* | 10/2008 | Childress et al. | 709/223 |
| 2008/0256238 A1* | 10/2008 | Hu et al. | 709/226 |
| 2009/0070770 A1* | 3/2009 | Gasca et al. | 718/104 |
| 2009/0276771 A1* | 11/2009 | Nickolov et al. | 717/177 |
| 2009/0288084 A1* | 11/2009 | Astete et al. | 718/1 |
| 2009/0327471 A1* | 12/2009 | Astete et al. | 709/223 |
| 2010/0050172 A1* | 2/2010 | Ferris | 718/1 |
| 2010/0115095 A1* | 5/2010 | Zhu et al. | 709/226 |
| 2010/0138830 A1* | 6/2010 | Astete et al. | 718/1 |
| 2010/0153960 A1* | 6/2010 | Youn et al. | 718/104 |
| 2010/0169489 A1* | 7/2010 | Akiyama et al. | 709/226 |
| 2010/0223385 A1* | 9/2010 | Gulley et al. | 709/226 |
| 2010/0262695 A1* | 10/2010 | Mays et al. | 709/226 |
| 2010/0306379 A1* | 12/2010 | Ferris | 709/226 |
| 2010/0306772 A1* | 12/2010 | Arnold et al. | 718/1 |

FOREIGN PATENT DOCUMENTS

| | | |
|---|---|---|
| JP | 2003-058518 A | 2/2003 |
| JP | 2007-249470 A | 9/2007 |
| JP | 2008-542871 A | 11/2008 |
| TW | 508505 | 11/2002 |

* cited by examiner

500

| CLOUD ID | HOST NAME | IP ADDRESS | ACCESS INFORMATION | CHARGE INFORMATION |
|---|---|---|---|---|
| 1000 | Cloud01 | XX.XX.XX.XX | ...... | ...... |
| 1001 | Cloud02 | YY.YY.YY.YY | ...... | ...... |

| CLOUD ID | CLOUD NAME | SERVICE ID | SERVICE NAME | SLA | COST | CHARGE INFORMATION |
|---|---|---|---|---|---|---|
| 1000 | IBM-C | SSSS | SCIENTIFIC COMPUTATION | ...... | ...... | 0.3$/HOUR |
| 1000 | IBM-C | DSSS | TEMPORARY DISK RENTAL | ...... | ...... | 0.005$/MB*DAY |
| 1001 | IBM-D | DDDD | DATA ANALYSIS | ...... | ...... | 500$ |

| CLOUD ID | SERVICE ID | RESOURCE NAME | NUMBER OF REQUESTS | NUMBER OF UNDERTAKEN REQUESTS |
|---|---|---|---|---|
| 1000 | P0001 | CALCULATED SERVICE | 750 | 500 |
| 1000 | HW001 | DISK STORAGE | 400 | 400 |
| 1001 | S0001 | TEXT ANALYSIS | 500 | 300 |

| RESOURCE TYPE | RESOURCE NAME | SLA | COST CONDITIONS | AMOUNT OF REQUEST | AMOUNT OF SHORTAGE |
|---|---|---|---|---|---|
| SYSTEM | ANY | ...... | ...... | ...... | ...... |
| SERVICE | TEXT ANALYSIS | ...... | ...... | ...... | ...... |

FIG. 8

MECHANISMS FOR EXECUTING A PROCESS IN A CLOUD COMPUTING ENVIRONMENT

BACKGROUND

The present invention relates to an improved computer system, method, and program product, and more specifically to an improved mechanism for executing a process in a cloud computing environment.

Recently, much attention has been given to cloud computing, which delivers various services and/or computer platforms by using combinations of hardware resources such as CPU, memory, storage and software resources, such as applications, in response to a user's request over a network. Generally, in cloud computing environments, pay-per-use models, which bill each user according to quantity of resources consumed, are used.

In cloud computing, as in conventional server-client computer systems, the amount of requested services may change with time of day and season. In such a case, if an attempt is made to satisfy all the requests within a cloud provided by a single computer system, the resources may be scarce during peak hours (with large amounts of services being requested) but may be abundant during off peak hours (with small amounts of services being requested). The shortage of resources during peak hours deteriorates the service quality and the excessive amount of resources during off peak hours introduces waste with regard to the cost of support.

SUMMARY

In order to solve the above-mentioned problems, in a first aspect of the present invention, there is provided a computer system for executing a process specified by a user and charging the user for the process. The computer system comprises a receiving part for receiving an instruction to execute the specified process and a determining part for determining an external resource to provision from a first other computer system for a charge. The computer system further comprises an external resource securing part for securing the external resource on the first other computer system and an executing part for causing the external resource to execute at least a part of the specified process.

The above summary of the present invention is not intended to present all the necessary features of the present invention. Sub combinations of the features may also constitute the invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 shows an example of a cloud table which is stored in a cloud DB according to one illustrative embodiment;

FIG. 6 shows an example of a prime contractor table which is stored in a prime contractor DB according to one illustrative embodiment;

FIG. 7 shows an example of a service request table which is stored in the subcontractor DB according to one illustrative embodiment;

FIG. 8 shows an example of a subcontractor cloud search request table which is stored in the subcontractor DB according to one illustrative embodiment;

DETAILED DESCRIPTION

Although the present invention will be described below with reference to the illustrative embodiments thereof, the illustrative embodiments are not intended to limit the present invention as defined in the claims. Furthermore, all the combinations of features discussed in the illustrative embodiments might not be absolutely necessary for the inventive solution.

Figure 1:
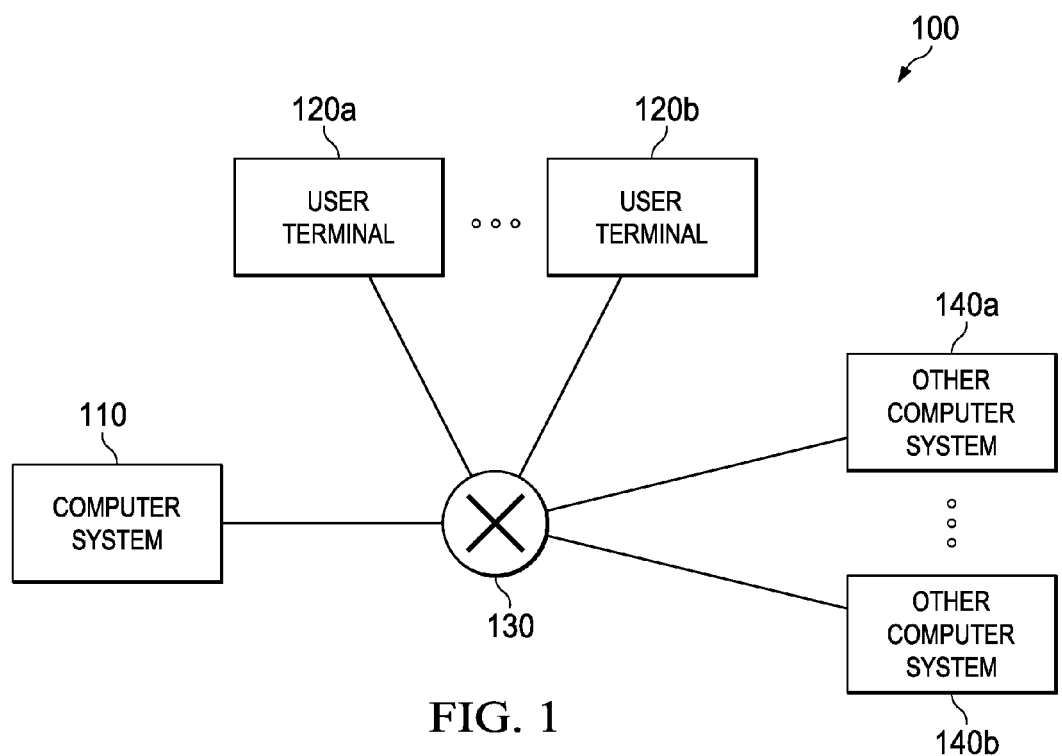
FIG. 1 shows a configuration of a distributed system according to one illustrative embodiment.

FIG. 1 shows a configuration of a distributed system 100 according to one illustrative embodiment. The distributed system 100 includes a computer system 110, one or more user terminals 120a-b, networks 130a-b, and one or more other computer systems 140a-b. The computer system 110 secures at least a hardware resource and/or software resource within itself and executes a user-specified process as a prime contractor, for example in response to a user's process request from the user terminal 120a. If the resource secured by the computer system 110 for the process falls short of a required amount of resources of the user-specified process, the computer system 110 makes the one or more computer systems 140a-b its subcontractor and requests them to execute all or a part of the process. If there are sufficient resources left over in the computer system 110 after securing resources for the user-specified process, the computer system 110 undertakes all or a part of a process which is originally undertaken and to be executed by the one or more computer systems 140a-b as prime contractors from the one or more computer systems 140a-b.

The one or more user terminals 120a-b are used by a user to instruct the computer system 110 to execute a service, a program, or the like, and to receive the execution result of the service, the program, or the like. The term 'service' refers to execution of information corresponding to a user's request for predetermined information processing, in response to the request. The network 130 is the Internet, an intranet, and/or a local area network, connecting the one or more user terminals 120a-b, the computer system 110, and the one or more other computer systems 140a-b.

Figure 2:
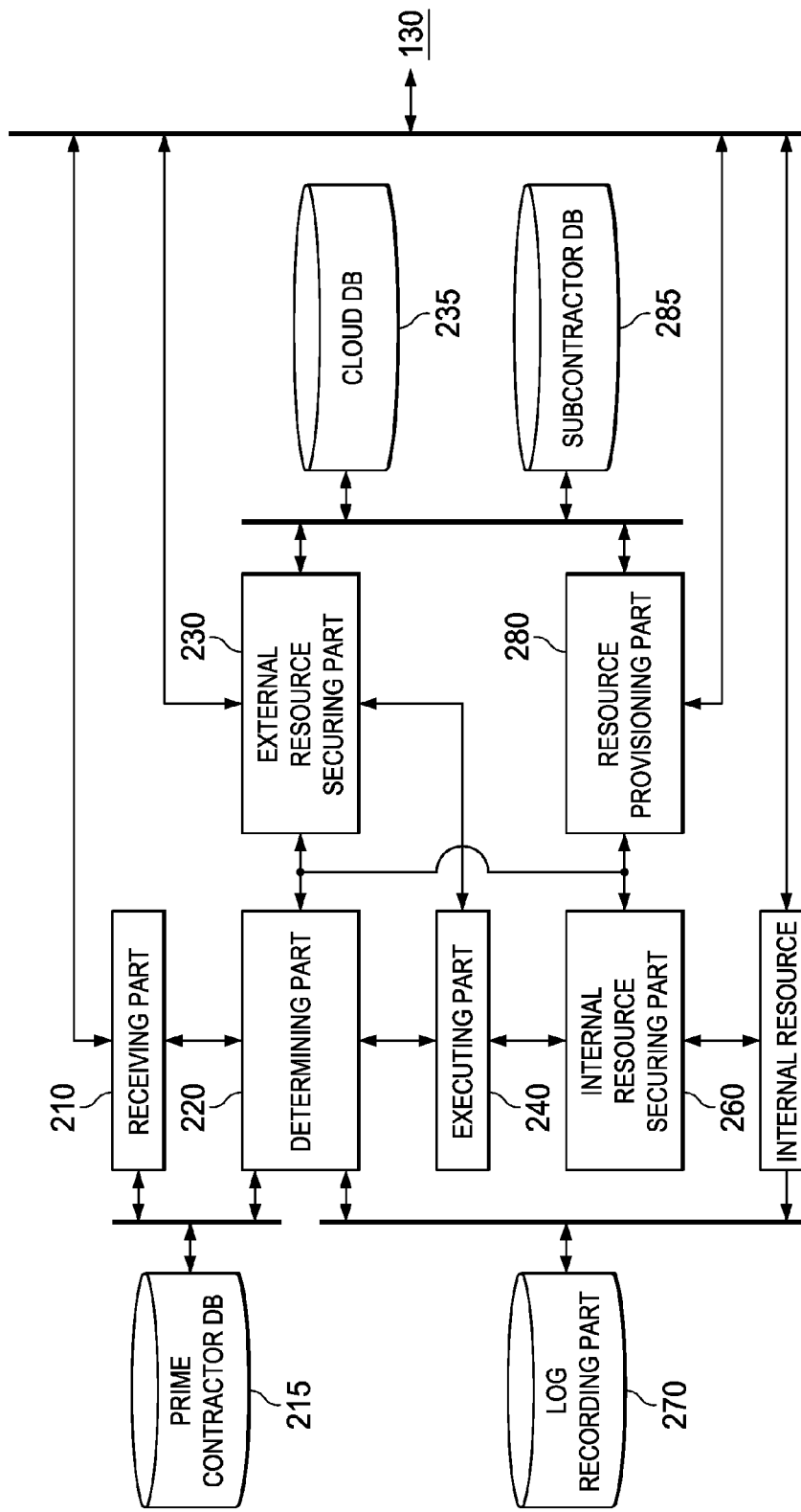
FIG. 2 shows an example of a configuration of a computer system according to one illustrative embodiment.

FIG. 2 shows an example of a configuration of the computer system 110 according to one illustrative embodiment. The computer system 110 includes a receiving part 210, a prime contractor DB 215, a determining part 220, an external resource securing part 230, a cloud DB 235, an executing part 240, internal resources 250, an internal resource securing part 260, a log recording part 270, a resource provisioning part 280, and a subcontractor DB 285. The computer system 110 executes a process specified by the user and charges the user for the same.

The receiving part 210 receives an instruction to execute a specified process. The receiving part 210 may receive the instruction to execute the specified process sent by user(s) from the one or more user terminals 120a-b, via the network 130. The receiving part 210 may receive the instruction to execute a service as a specified process.

The receiving part 210 may receive the instruction to execute the specified process, and a request for a service level which needs to be satisfied by the resource to execute the specified process. The service level may be the guaranteed performance to ensure reliability (e.g., mean time between failures (MTBF)), the guaranteed performance of operating ratio, whether or not to encrypt, the encryption level, and/or whether or not to share the hardware resources with the other specified processes, as an example. The receiving part 210 may receive the request for a service level which includes specification of a service level corresponding to each of one or more service level offerings (SLO).

The prime contractor DB 215 stores a prime contractor (service offering) table which a list of services to be delivered to the user. The receiving part 210 may present the list of services to be delivered to the user by referring to the prime contractor DB 215.

The determining part 220 determines an external resource to provision for a charge from the one or more other computer systems 140a-b. The external resource is a resource of any one of the one or more other computer systems 140a-b. The determining part 220 may determine the external resource to provision based on the SLA (Service Level Agreement), which is a guarantee for the one or more SLOs.

The external resource securing part 230 secures the external resource(s) on the one or more other computer systems 140a-b. The cloud DB 235 stores a cloud table which contains the cloud ID, and the IP address, access information and so forth, which is required to access the cloud, for the cloud provided by the computer system 110 and the cloud provided by the one or more other computer systems 140a-b. The external resource securing part 230 may refer to the cloud DB 235 when the determining part 220 determines the external resource to provision. Accordingly, the external resource securing part 230 enables the determining part 220 to reference the cloud by using the cloud ID. The external resource securing part 230 may cause the one or more other computer systems 140a-b to execute at least a part of the specified process in response to the instruction to execute the specified process.

The executing part 240 causes the external resource to execute at least a part of the specified process. After receiving the execution instruction from the determining part 220, the executing part 240 may immediately return control to the determining part 220. The executing part 240 may issue the instruction to execute at least a part of the specified process to the external resource securing part 230 for the purpose of causing the external resource to execute at least a part of the specified process.

Here, the determining part 220 or the executing part 240 may secure the external resource in advance or after having received the execution instruction. For example, for a frequent SLA request, the determining part 220 or the executing part 240 may secure the external resource in advance. Securing the external resource in advance enables the computer system 110 to deliver a more consistent service to the user when it delivers the frequent service by using the external resource. For an infrequent service SLA, the executing part 240 may secure the external resource after having received the execution instruction.

The internal resources 250 are resources of the computer system 110. Here, the resource refers to a computer resource of arbitrary scale. The resource is implemented by a cloud computing system, a grid computing system, a parallel computer, a super computer, a server, a personal computer, or combinations of any number of these, for example. The internal resource 250 may send and receive input/output data of the specified process to/from the one or more user terminals 120a-b and/or the one or more other computer systems 140a-b via the network 130.

The internal resource securing part 260 secures the internal resource(s) 250. For example, the internal resource securing part 260 may store the estimated start time of securing and the estimated end time of securing for each of the internal resources 250, and in response to an instruction to secure the internal resource(s) 250 from the determining part 220, search for and secure a vacancy in the internal resources 250 based on the estimated start time of securing and the estimated end time of securing. The internal resource securing part 260 may provide information on an actual amount of resources and a deployment as well as on a currently used amount of resources and their locations in the internal resources 250. In response to the securing instruction, when there is a vacancy in the internal resources 250, the internal resource securing part 260 may secure the internal resource(s) 250. In response to the instruction to execute the specified process, the internal resource securing part 260 may cause the internal resource 250 to execute at least a part of the specified process.

The executing part 240 may cause the external resource to execute a part of the specified process and the internal resource to execute the other part of the specified process. For example, when the internal resources 250 have a vacancy, the executing part 240 can cause the internal resource(s) 250 to execute the specified process by issuing the instruction to execute the specified process to the internal resource securing part 260. When the internal resources 250 run out of vacancies, the executing part 240 may cause the external resource to execute a part of the specified process by issuing the instruction to execute a part of the specified process to the external resource securing part 230. In this manner, the computer system 110 can deliver the user with more inexpensive and contiguous services.

When the receiving part 210 receives the service level request, the executing part 240 may cause the internal resource 250 and the external resource which satisfy the service level request to execute the specified process. The executing part 240 may cause the internal resource 250 and the external resource to execute the specified process by issuing the instruction to execute the specified process to the external resource securing part 230 and the internal resource securing part 260.

The log recording part 270 records a log of the instructions to execute the specified processes, which the computer system 110 received, and/or an execution log of the specified processes. Accordingly, the determining part 220 can quantitatively determine the amount of resources to be used for the specified process based on the log, and thereby it can estimate the amount of resources to provision more accurately.

The resource provisioning part 280 secures the internal resource(s) 250 in response to a request from at least either of the one or more other computer systems 140a-b, and allows it (or them) to use the resource(s) as a resource(s) provisioned and charges for the same. The subcontractor DB 285 stores a subcontractor (service offering) table, which is a list of services to be provisioned to the other computer systems 140a-b. The resource provisioning part 280 may present the list of services to be provisioned to the one or more other computer systems 140a-b by referring to the subcontractor DB 285. The resource provisioning part 280 may cause the internal resource securing part 260 to secure the internal resource(s) 250 by issuing the instruction to secure the internal resource(s) 250 thereto, and cause at least either of the one or more other computer systems 140a-b to use the internal resource(s) 250.

Figures 3, 4:
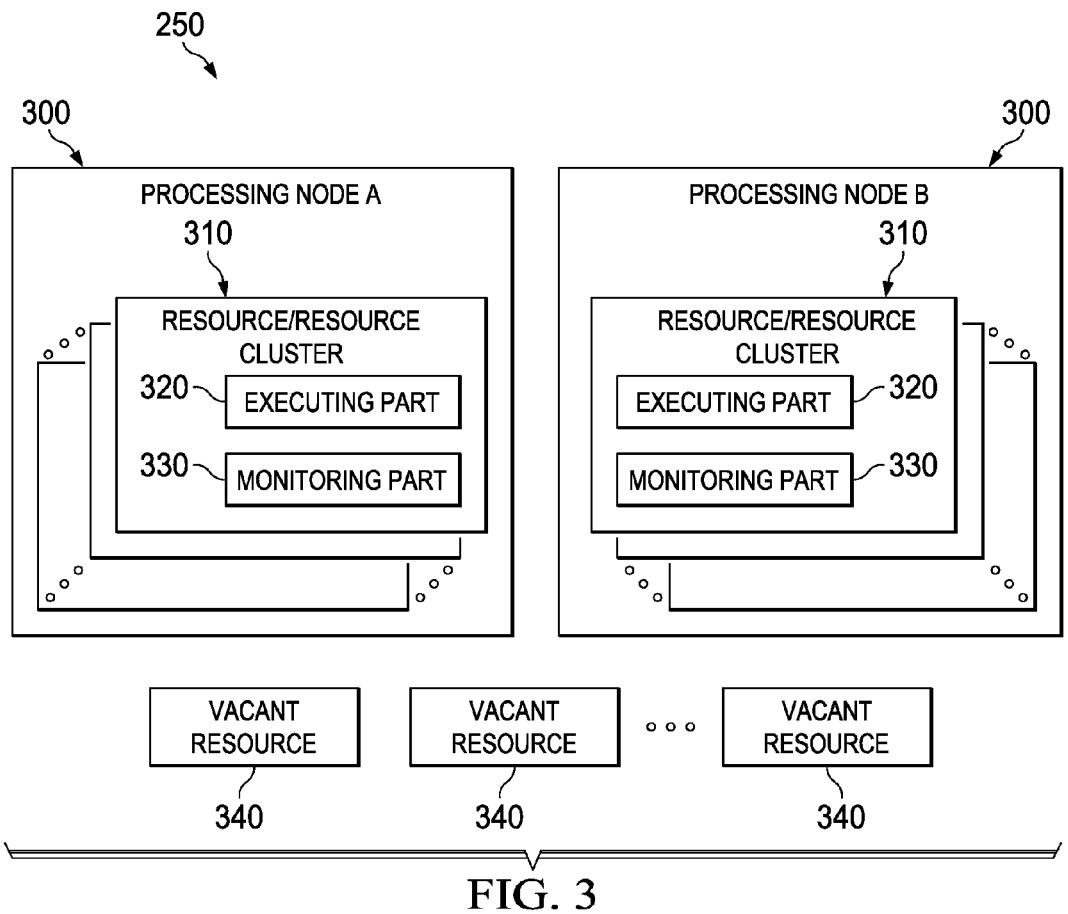
FIG. 3 shows an example of a logical configuration of an internal resource according to one illustrative embodiment.
FIG. 4 shows an example of a subcontractor table which is stored in a subcontractor DB according to one illustrative embodiment.

FIG. 3 shows an example of a logical configuration of the internal resource 250 according to the embodiment. The internal resource(s) 250 are one or more resources to be used for executing the information processing. The resources of the internal resources 250 may be hardware resources to be used for executing the information processing, such as a physical or logical processor, memory, storage, communication interface, information processing equipment, computer cluster, or the like. The resources of the internal resources 250 may also be software resources, for example, application programs, operating systems and the like, which can be simultaneously used by the limited number of users.

Each of one or more processing nodes 300 may be a virtual computer system which is composed of a combination of one or more resources (cluster) 310 and collaborates with other computer systems to execute the specified process. The one or more resources (cluster) 310 of each of the processing nodes 300 are secured by the internal resource securing part 260 for the purpose of executing the corresponding specified process, in response to the user's approval. Each of the resources (cluster) 310 is composed by occupying a resource or a cluster of two or more resources (for example, CPU+memory+hard disk) or a part of these resources or the like. Each of the resources (cluster) 310 includes an executing part 320 for executing a part or the entire of the specified process, and a monitoring part 330 for monitoring the status of execution in the executing part 320 and sending the monitored result to the log recording part 270 in the computer system 110. The computer system 110 may contain one or more vacant resources 340 in an idle state which are not secured for any specified process.

FIG. 4 shows an example of a subcontractor table 400 which is stored in the subcontractor DB 285 according to the embodiment. The subcontractor table 400 contains attributes of the resource to be used for the service such as 'cloud ID', 'service ID', 'resource name', 'resource type', 'cost' and so forth, and 'SLA' and so forth which the resource can satisfy, corresponding to each service provisioned by the resource provisioning part 280. The administrator of the computer system 110 may be able to update the subcontractor table 400.

The 'cloud ID' is an ID assigned to a cloud which is to process the service. The computer system 110, one or more user terminals 120a-b, and one or more other computer systems 140a-b may use the cloud ID in specifying the cloud. For example, the service in the first entry of the subcontractor table 400 is processed by the cloud of the cloud ID '1000'.

The 'service ID' is an ID assigned to each service. The computer system 110, one or more user terminals 120a-b, and one or more other computer systems 140a-b may use the service ID in specifying the service. For example, the service in the first entry of the subcontractor table 400 has the service ID "P0001." The resource provisioning part 280 may use the service ID as a main key for the subcontractor table 400.

The 'resource name' is the name of resource used for each service. The 'resource type' indicates the type of the resource. For example, the service in the first entry of the subcontractor table is processed on the resource of the resource type "Processor" which is good at calculation.

The 'cost' is the cost of the resource to process each service. For example, the administrator of the computer system 110 may calculate the cost of the resource based on the depreciation over the unit time of the TCO (Total Cost of Ownership), which is the total cost of the purchase price, the costs for maintenance and support including electricity costs, personnel costs, and so forth of the resource, and the disposal cost of the resource, as well as the average usage rate of the resource. The cost may be registers in the subcontractor table 400. The subcontractor table 400 may contain 'charge information' which is updated according to the usage state of the resource in place of or along with 'cost'.

FIG. 5 shows an example of a cloud table 500 which is stored in the cloud DB 235 according to one illustrative embodiment. The cloud table 500 contains 'cloud ID', 'host name', 'IP address', and 'access information' corresponding to each of the clouds provided by the computer system 110 and the one or more other computer systems 140a-b. The 'cloud ID' is an ID assigned to each cloud. The administrator of the computer system 110 may be allowed to update the cloud table 500.

The 'host name', 'IP address', and 'access information' are used by the computer system 110 and the one or more other computer systems 140a-b in accessing each cloud via the network 130. Since the external resource securing part 230 and the resource provisioning part 280 obtain the IP address and so forth of each cloud by referring to the cloud table 500, the receiving part 210, determining part 220, and executing part 240 can refer to each cloud via the external resource securing part 230 and the resource provisioning part 280 without using the IP address and so forth.

FIG. 6 shows an example of a prime contractor table 600 which is stored in the prime contractor DB 215 according to one illustrative embodiment. The prime contractor table 600 contains attributes of the service such as 'cloud ID', 'cloud name', 'service ID', 'service name', and 'cost' and so forth corresponding to each service delivered by the computer system 110. The prime contractor table 600 further comprises 'SLA' which the resource can satisfy and 'charge information' on the service, corresponding to each service delivered by the computer system 110. The 'service ID', 'cloud ID', and 'SLA' are the same as those in the subcontractor table 400. On the other hand, since the user who requests a service of the prime contractor is not concerned with the type of resource to be used in processing the service as long as the SLA is satisfied, the prime contractor table 600 does not need to contain such items as the 'resource type' and so forth. The administrator of the computer system 110 may be able to update the prime contractor table 600.

The 'cost' is a cost required to process each service. The determining part 220 may calculate the cost of support required to process each service and update the prime contractor table 600 in the prime contractor DB 215 by the cost of support as 'cost'.

The 'service name' is the name of the service. The 'cloud name' is the name of the cloud which provisions the resource to be used for the service. For example, the service in the first entry of the prime contractor table 600 has the service name 'scientific computation' and is executed in the cloud of the cloud name 'IBM-C'.

The 'charge information' is referred to by the computer system 110 in charging the user who has used the service. For example, the user who has used the service in the first entry of the prime contractor table 600 is charged $0.3 per hour. The charge will be the service provider's income derived from undertaking the delivery of the service. The difference between the charge and the cost will be the service provider's profit derived from undertaking the delivery of the service.

FIG. 7 shows an example of a service request table 700 which is stored in the subcontractor DB 285 according to one illustrative embodiment. The service request table 700 contains the attributes of the service such as 'cloud ID', 'service ID', and 'resource name' and so forth, 'number of requests' which is the amount of resources requested of the service, and 'number of undertaken requests' which is the amount of resources provisioned in fact in response to the request, etc., corresponding to each subcontracted service delivered by the computer system 110 and the one or more other computer systems 140a-b. The 'cloud ID', 'service ID', and 'service name' are the same as those in the prime contractor table 600. The external resource securing part 230 may select the external resource to provision based on the service request table 700.

FIG. 8 shows an example of a subcontractor cloud search request table 800 which is stored in the subcontractor DB 285 according to one illustrative embodiment. The subcontractor cloud search request table 800 contains attributes of the service such as 'resource type', 'resource name' and so forth, 'SLA' and 'cost condition' which are requested of the service, 'number of requests' which is the amount of resources to request, and 'number of undertaken requests' which is the amount of resources provisioned in fact, etc., corresponding to each external resource provisioned by the one or more other computer systems 140a-b. The 'cloud ID', 'service ID', and 'service name' are the same as those in the prime contractor table 600.

Figure 9:
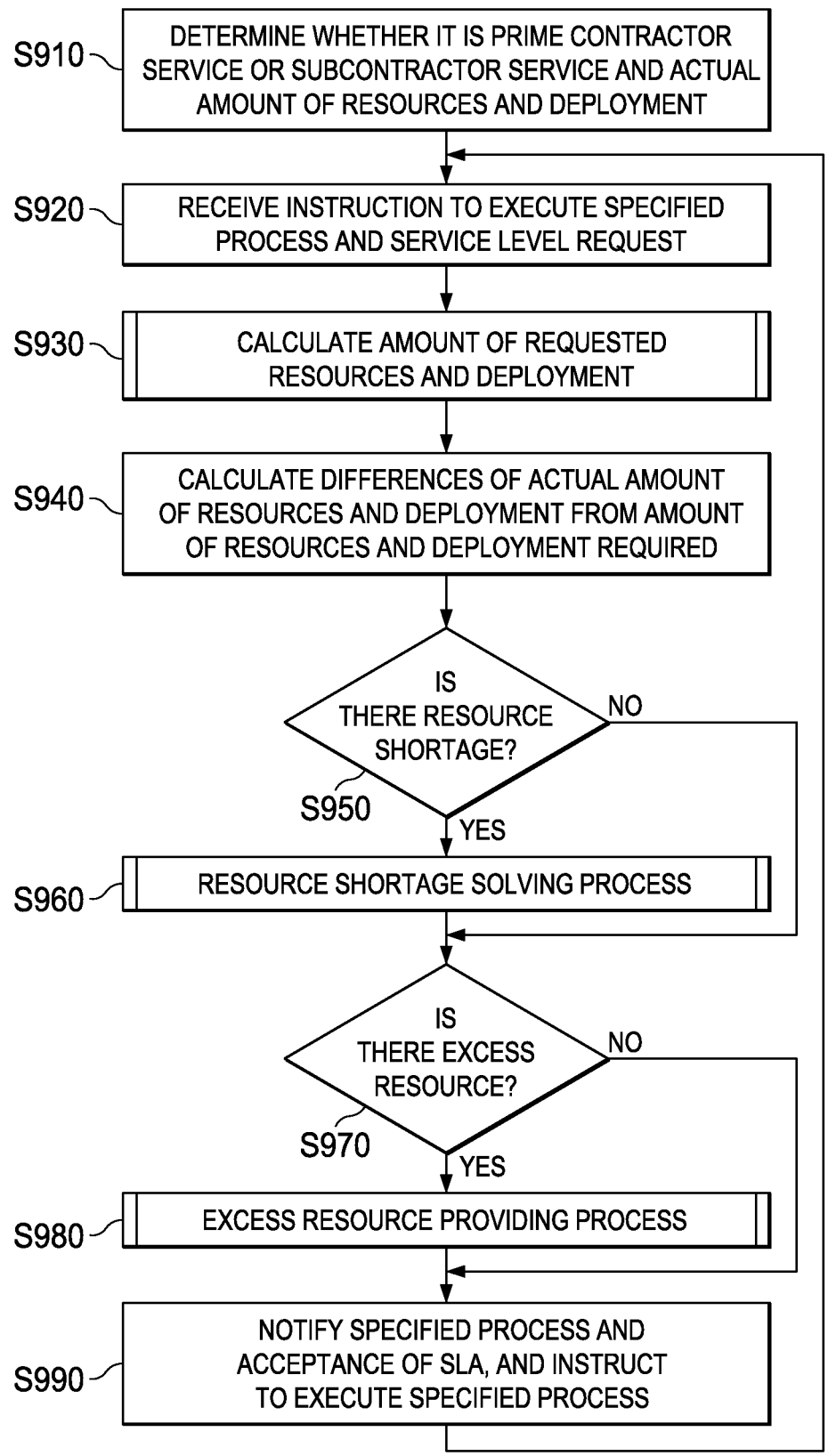
FIG. 9 shows an example of the process flow of the computer system according to one illustrative embodiment.

FIG. 9 shows an example of the process flow of the computer system 110 according to one illustrative embodiment. First, the determining part 220 determines whether it is the prime contractor service or subcontractor service, and the actual amount of resources and deployment (S910). The determining part 220 may determine whether it is the prime contractor service or the subcontractor service by referring to the prime contractor table 600 and the subcontractor table 400. The determining part 220 may determine the amount of resources and deployment by inquiring of the internal resource securing part 260 about them.

Next, the determining part 220 receives the instruction to execute the specified process and the service level request received by the receiving part 210 (S920). Here, the determining part 220 may receive a plurality of such requests simultaneously. Then, the determining part 220 calculates the amount of requested resources and deployment required to satisfy the service level requests) (S930).

Next, the determining part 220 calculates differences of the actual amount of resources and deployment from the amount of resources and deployment required (S940). The determining part 220 may calculate the differences for each SLA based on the actual amount of resources and deployment and the currently used amount of resources and deployment obtained by inquiring of the internal resource securing part 260 as well as the amount of resources and deployment calculated at step S930. Then, the determining part 220 determines whether there is a resource shortage or not based on the differences calculated at step S940 (S950).

If it is determined that there is a resource shortage (S950: Y), the determining part 220 executes a process of solving the resource shortage (S960). The determining part 220 may change the allocations of the internal resource secured in the computer system 110 and the external resource secured in the first other computer system 140a so as to increase the profit, e.g., the cost of support for the computer system 110 including the charge billed by the first other computer system subtracted from the charge for the computer system 110.

Here, the cost of support for the computer system 110 includes a cost required to execute resource provisioning, a cost required to execute the specified process after the resource provisioning, and a cost required to use the external resource of the one or more other computer systems 140a-b. The payment for the computer system 110 is the sum of the charge billed for the one or more other computer systems 140a-b and the charge the user is billed.

The determining part 220 may secure the resource(s), which satisfies the service level request(s) and also requires the minimum cost of support among available resources of the computer system 110 and/or the first other computer system 140a, from the internal resources 250 and/or the external resource(s).

Here, the determining part 220 may determine that the resource satisfies the service level request when the resource satisfies the service level specifications corresponding to respective one or more SLOs included in the service level request. The cost of support may include the cost required to execute the provisioning.

In the computer system 110, when the internal resource(s) 250 for offering the services are in a large enough proportion, the cost of support for the computer system 110 is virtually the sum of the costs of support for respective resources of the internal resources 250. The cost of support for a resource includes the cost required for the resource to execute the resource provisioning and the cost required for the resource to execute the specified process after the resource provisioning.

Next, the determining part 220 determines whether there is an excess resource or not based on the differences calculated at step S940 (S970). The determining part 220 may determine whether there is an excess resource or not based on the amount of resources and deployment secured at step S960 as well as the differences. When it is determined that there is an excess resource (S970:Y), the determining part 220 executes a process of provisioning the excess resource (S980).

Next, the determining part 220 notifies the receiving part 210 of acceptance of the SLA corresponding to the specified process and requested service level, and instructs the executing part 240 to start executing the execution instruction (S990). Here, if the determining part 220 determines that acceptance of the SLA is not profitable enough, it may notify the receiving part 210 of rejection of the SLA instead of acceptance of the SLA. Subsequently, the determining part 220 repeats steps S920 to S990.

Figure 10:
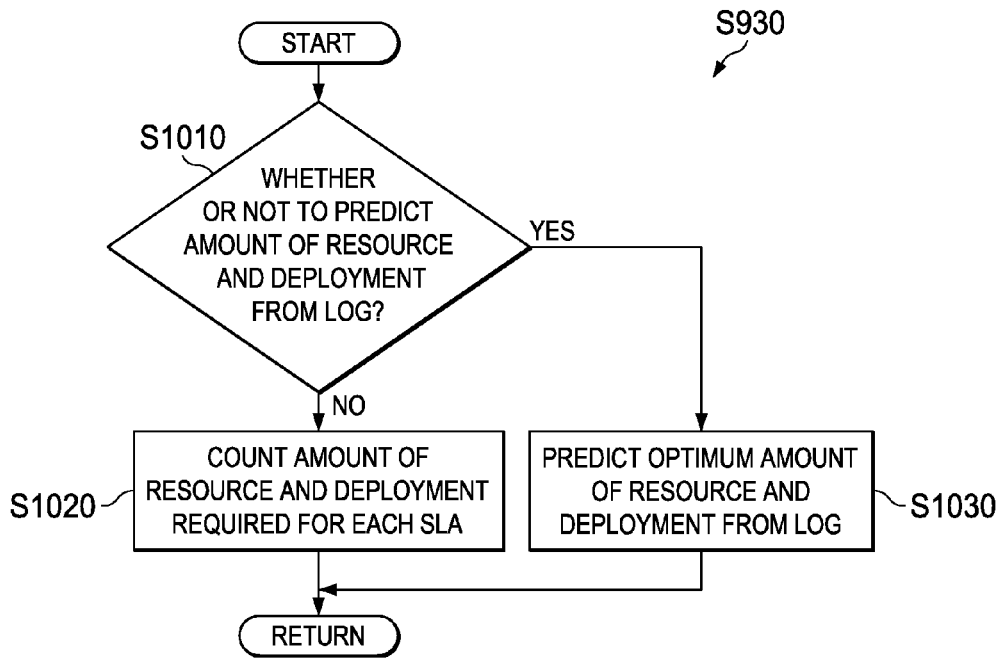
FIG. 10 shows an example of the process flow of step S930 shown in FIG. 9 according to one illustrative embodiment.

FIG. 10 shows an example of the process flow of step S930 shown in FIG. 9 according to one illustrative embodiment. The determining part 220 may determine the amount of internal resource to use in the computer system 110 and/or the amount of external resource to provision from the one or more other computer systems 140a-b, based on the log recorded in the log recording part 270. First, the determining part 220 determines whether or not to predict the amount(s) of resource(s) and deployment from the log(S1010). The determining part 220 may make the determination based on the policy registered in advance by the administrator of the computer system 110.

If it is determined not to predict the amount(s) of resource(s) and deployment from the log (S1010:No), the determining part 220 counts the amount(s) of resource(s) required for each SLA corresponding to each of the requested service level(s) received together with each execution request and calculates the amount(s) of resource(s) and deployment required, for all the execution request(s) received (S1020). If the requested service level(s) are not received with the execution request(s), the determining part 220 may refer to the prime contractor table 600 or subcontractor table 400 and count the amount(s) of resource(s) required by using the SLA(s) which have been associated with the execution request(s) in place of the SLA(s) corresponding to the requested service level(s).

If it is determined to predict the amount(s) of resource(s) and deployment from the log (S1010:Yes), the determining part 220 obtains the log information by inquiring of the log recording part 270 and predicts the optimum amount(s) of resource(s) and deployment from the log information at step S1030. For example, if the cost of the resource(s) corresponding to the optimum SLA(s) calculated from the execution log for the service is lower than the cost of the resource(s) corresponding to the SLA(s) corresponding to the requested service level(s) or the SLA(s) which have been associated with the execution request(s), the determining part 220 may count the amount(s) of resource(s) required by using the optimum SLA(s) for the future use of the resource(s) corresponding to the optimum SLA(s). In this manner, the computer system 110 can lower the cost of the resource(s) further.

Figure 11:
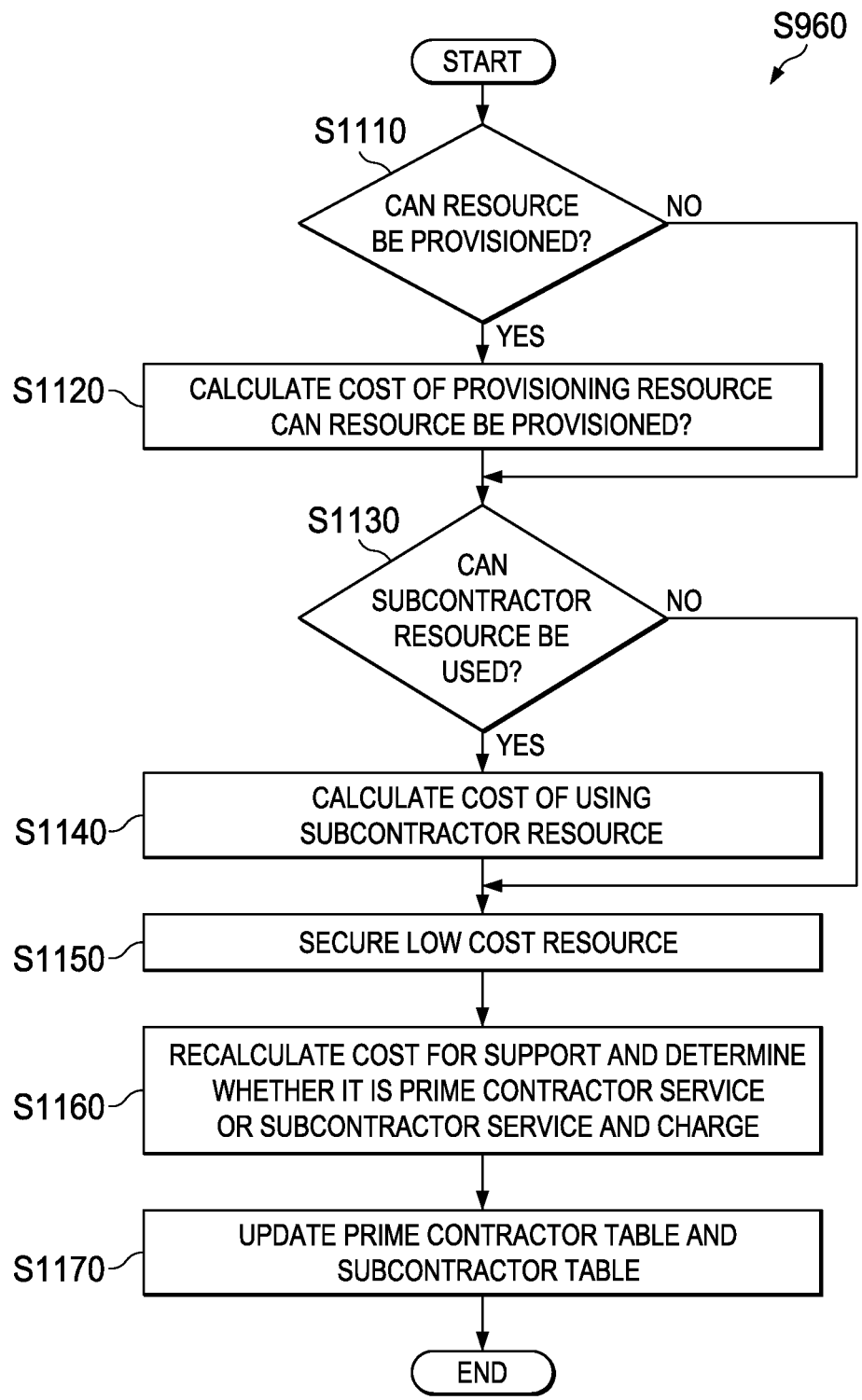
FIG. 11 shows an example of the process flow of step S960 shown in FIG. 9 according to one illustrative embodiment.

FIG. 11 shows an example of the process flow of step S960 shown in FIG. 9 according to one illustrative embodiment. First, the determining part 220 determines whether the resource(s) can be provisioned or not (S1110). The determining part 220 may determine whether the resource(s) can be provisioned or not by inquiring of the internal resource securing part 260 about the presence/absence of vacancy in the internal resources 250.

If the determining part 220 determines that the resource(s) can be provisioned (S1110:Yes), then the determining part 220 calculates the cost for the provisioning required to provision the resource(s) (S1120). The determining part 220 may determine whether or not to execute the provisioning to replace the operating system or application program running on at least one of the resources of the computer system 110 by another operating system or application program. In that case, the determining part 220 may add the cost of the resource(s) required to execute the provisioning to the provisioning cost. Also, the determining part 220 may add the cost required to execute necessary transfer of data between the resources in provisioning the resource(s) to the provisioning cost.

Next, the determining part 220 determines whether the subcontractor resource(s) can be used or not (S1130). The determining part 220 may use the service request table 700 and the subcontractor cloud search request table 800 for determining whether the subcontractor resource(s) can be used or not.

If the determining part 220 determines that the subcontractor resource(s) can be used (S1130:Yes), the determining part 220 calculates the cost of using the subcontractor resource(s) (S1140). If there are insufficient resource, available in the computer system 110 and the one or more other computer systems 140a-b, at the service level which is the same level as that of the specifications of the service level corresponding to one or more SLOs included in the service level request(s), the determining part 220 may secure the resource(s) at a service level higher than the specifications of the service level as the internal resource(s) or the external resource(s). In this manner, the computer system 110 can accept the requested service level even if there is not a resource corresponding to the requested service level, so that it can curb degradation of the service due to resource shortage.

The determining part 220 may determine to cause a redundant configuration of two or more resources, each of which does not satisfy the availability included in the service level request among the available resources of the computer system 110 and the one or more other computer systems 140a-b, to function as a resource that satisfies the availability. For example, if 200 resources at 80% availability are in the internal resources 250, the determining part 220 can determine to cause a redundant configuration of the 200 resources to function as 100 resources at 96% (=(1−0.2×0.2)×100%) availability.

Next, the determining part 220 causes the external resource securing part 230, and/or the internal resource securing part 260u, to secure low cost resource(s) (S1150). The term 'low cost resource' here preferably refers to a resource of the lowest cost of support among combinations of securable resources. The determining part 220 may calculate the cost of support for each resource by using a cost management curve of the value(s) of one or more SLOs versus the costs for support for the resources.

Next, the determining part 220 recalculates the costs for support and determines whether it is the prime contractor service or subcontractor services and/or the charges (S1160). When the profit, e.g., the charge billed by the first computer system 140a subtracted from the charge for the computer system 110, lowers to a standard proportion of the cost of support or below, the determining part 220 may raise the charge. That ensures the computer system 110 a certain profit even if the cost of support increases due to the resource provisioning. Next, the determining part 220 updates the charge information in the subcontractor table 400 and the prime contractor table 600 (S1170).

The determining part 220 may minimize the entire cost of support by reassigning the internal resources 250 and the external resources by taking account of the entire requests by all the users and other systems. As an example, the determining part 220 may calculate the optimum assignment of the resources by applying a round-robin algorithm, a genetic algorithm, or a solution to a knapsack problem; or may successively lower the cost of support by successively changing the resources.

Figure 12:
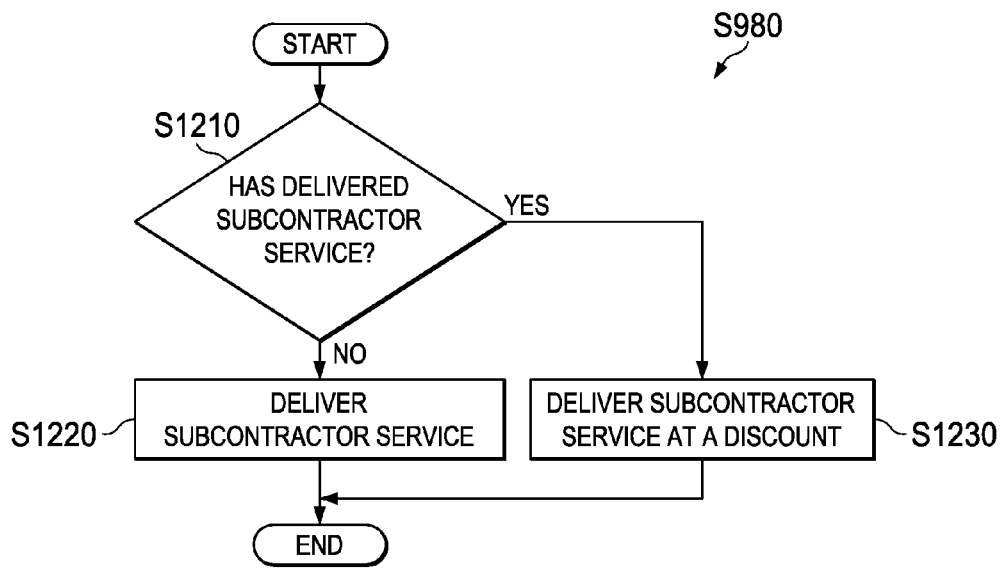
FIG. 12 shows an example of the process flow of step S980 shown in FIG. 9 according to one illustrative embodiment.

FIG. 12 shows an example of the process flow of step S980 shown in FIG. 9 according to one illustrative embodiment. The determining part 220 may change the charge to bill for the provisioned resource(s) based on at least either the presence/absence of vacancy or the vacant time of the internal resources 250. The determining part 220 may determine the presence/absence of vacancy and/or vacant time of the internal resources 250 by inquiring of the internal resource securing part 260 and obtaining the schedule of the internal resources 250 usage. The determining part 220 may also determine the presence/absence of vacancy and vacant time of the internal resources by inquiring of the log recording part 270 and obtaining the usage log of the internal resources 250.

First, the determining part 220 determines whether the system has provided the subcontractor service or not (S1210). The determining part 220 may make the determination by inquiring of the log recording part 270 about the log of the subcontractor services the internal resources 250 have provided.

If it is determined that the system has not provided the subcontractor service (S1210:No), the determining part 220 provides the subcontractor service in association with the excess resource. The determining part 220 may update the subcontractor table 400 by changing the charges, e.g., based on the depreciation over the unit time of the TCO and the average usage rate, and the expected return of the resource to be used, which have been input by the administrator of the computer system 110 for each subcontractor service.

If it is determined that the system has provided the subcontractor service (S1210:Yes), the determining part 220 provides the subcontractor service with a reduction in the charge (provides at a discount) (S1230). The determining part 220 may update the subcontractor table 400 by changing the charges based on the discount rate which have been input by the administrator of the computer system 110. That enables the computer system 110 to further increase the usage rate of the internal resource 250.

Figure 13:
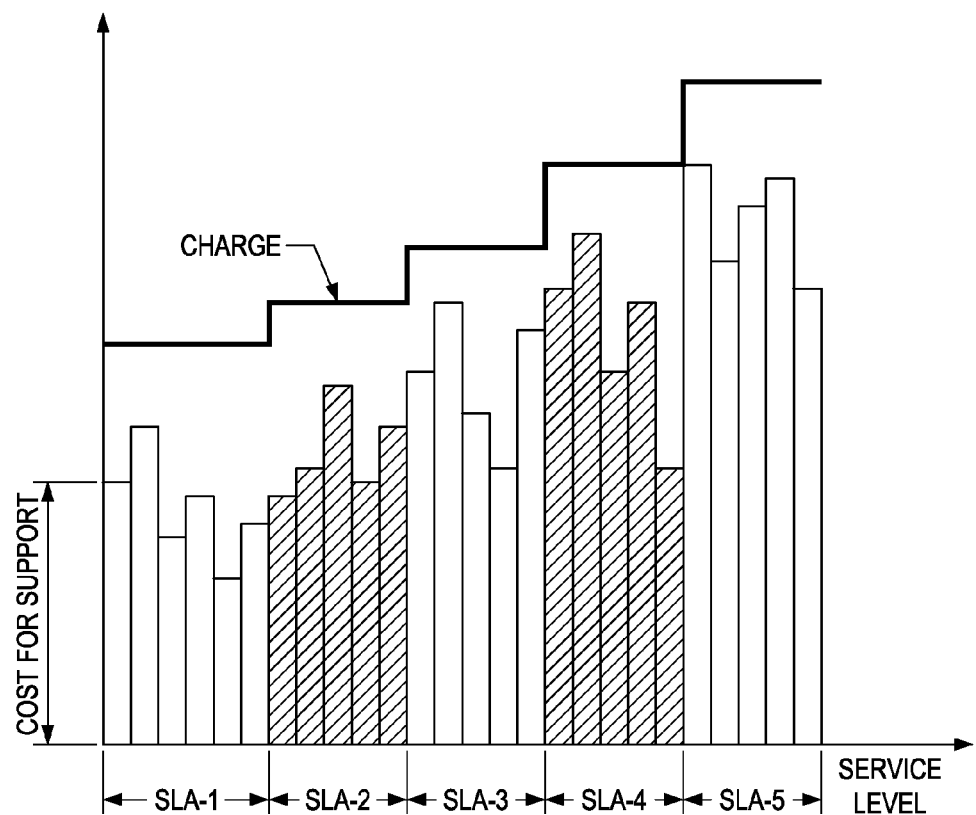
FIG. 13 shows an example of a graph of costs of support for resources versus charges for resources usage according to one illustrative embodiment.

FIG. 13 shows an example of a graph of costs of support for resources versus charges for resources usage according to one illustrative embodiment. The service level conditions are defined by one or more SLOs, and the SLA, which is a guarantee for the one or more SLOs, has a range for each of the SLOs. Namely, the SLA can be considered as the guarantee for multidimensional hyper-rectangles or combinations of the multidimensional hyper-rectangles with each SLO value of the one or more SLOs as a dimension. Therefore, a SLA is essentially satisfied by one or more resources which belong to the hyper-rectangles or the combinations of the hyper-rectangles.

The graph in FIG. 13 has a horizontal axis representing resources corresponding to five SLAs with one different SLO, which are displayed in the order of the service level of the one SLO, SLA-1, SLA-2, SLA-3, SLA-4, and SLA-5, and a vertical axis representing the cost of support and the charge for the resources. The graph shows six resources corresponding to SLA-1 and five resources corresponding to each of SLA-2, SLA-3, SLA-4, and SLA-5.

Usually, within each SLA, the cost of support for resources varies. But, as the service level increases, the cost of support also increases generally. On the other hand, the user does not mind which resource is practically used as long as the SLA is satisfied; therefore, the charge is in common within each SLA. Preferably, the charge is practically higher than the cost of support for any resource corresponding to each SLA. Also preferably, the charge steps up as the service level of the SLA rises.

Figure 14A:
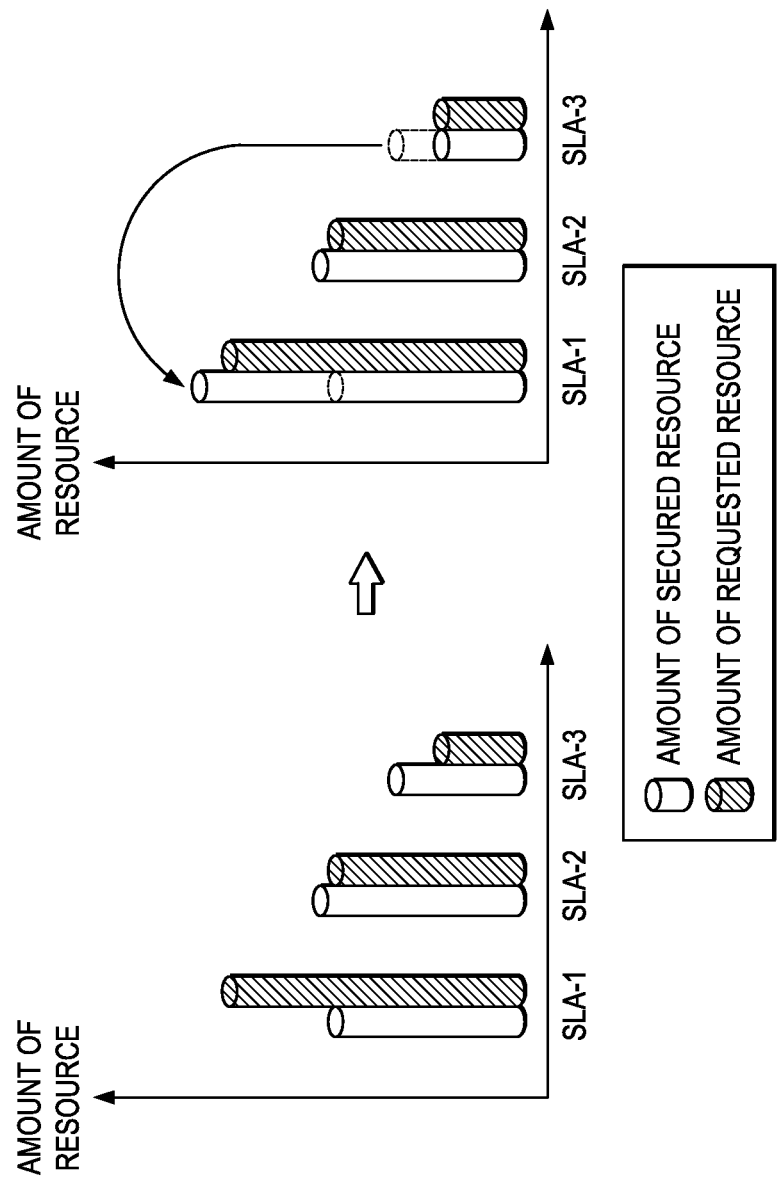
FIG. 14A shows an example of a cloud's self-provisioning of a resource according to one illustrative embodiment.

FIG. 14A shows an example of a cloud's self-provisioning of a resource according to one illustrative embodiment. The graph on the left in FIG. 14A shows the amounts of secured resources and the amounts of necessary resources corresponding to the three SLAs-SLA-1 to SLA-3, e.g., based on which the computer system 110 operates. In this case, since the amount of resource corresponding to SLA-1 falls short, the determining part 220 can determine to provision the excess resource corresponding to SLA-3 for SLA-1. That makes the amounts of secured resources exceed the amounts of necessary resources for all of SLA-1 to SLA-3.

Figure 14B:
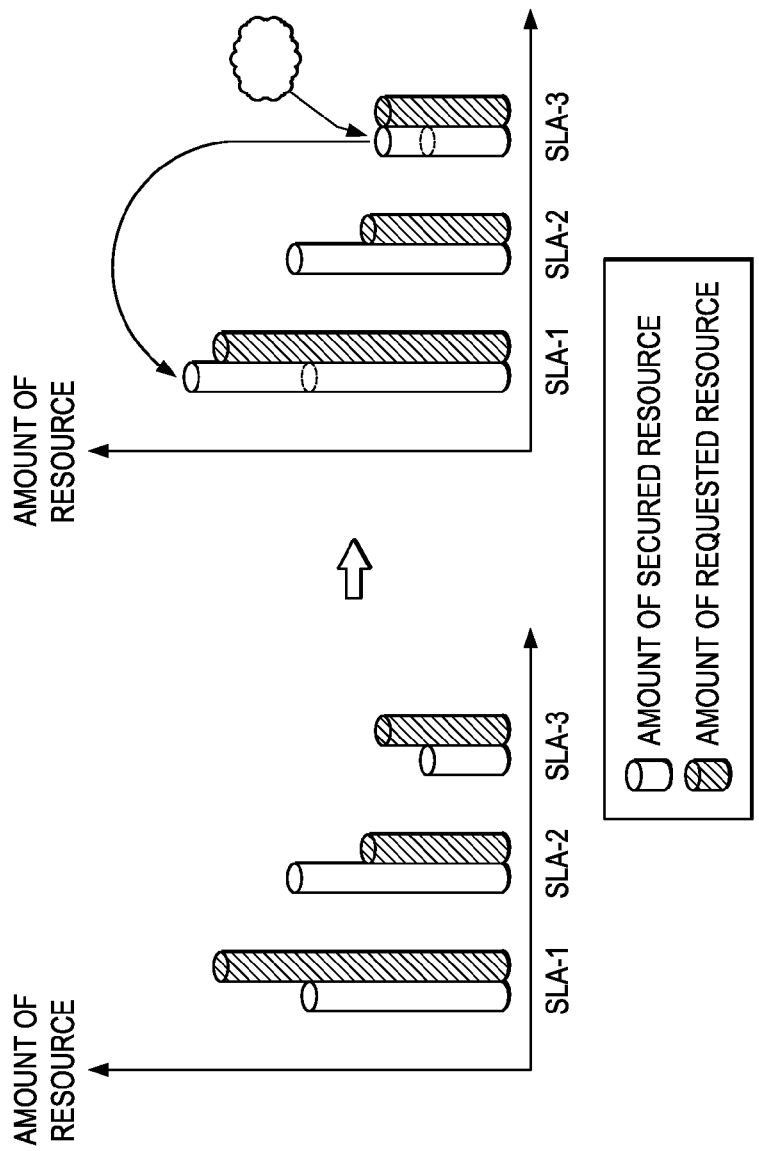
FIG. 14B shows an example of a cloud's self-provisioning of a resource and securing of a resource on another cloud according to one illustrative embodiment.

FIG. 14B shows an example of a cloud's self-provisioning of a resource and securing of a resource on another cloud according to one illustrative embodiment. In this case, since the amounts of resources corresponding to SLA-1 and SLA-3 fall short, the part 220 can determine to make the amount of secured resource exceed the amount of necessary resource for SLA-1 by provisioning the excess resource corresponding to SLA-3 for SLA-1. On the other hand, since the amount of resource corresponding to SLA-3 falls short, the determining part 220 can determine to secure an external resource corresponding to SLA-3 from other computer system 140a, i.e., another cloud. That makes the amounts of secured resources exceed the amounts of necessary resources for all of SLA-1 to SLA-3.

Figure 14C:
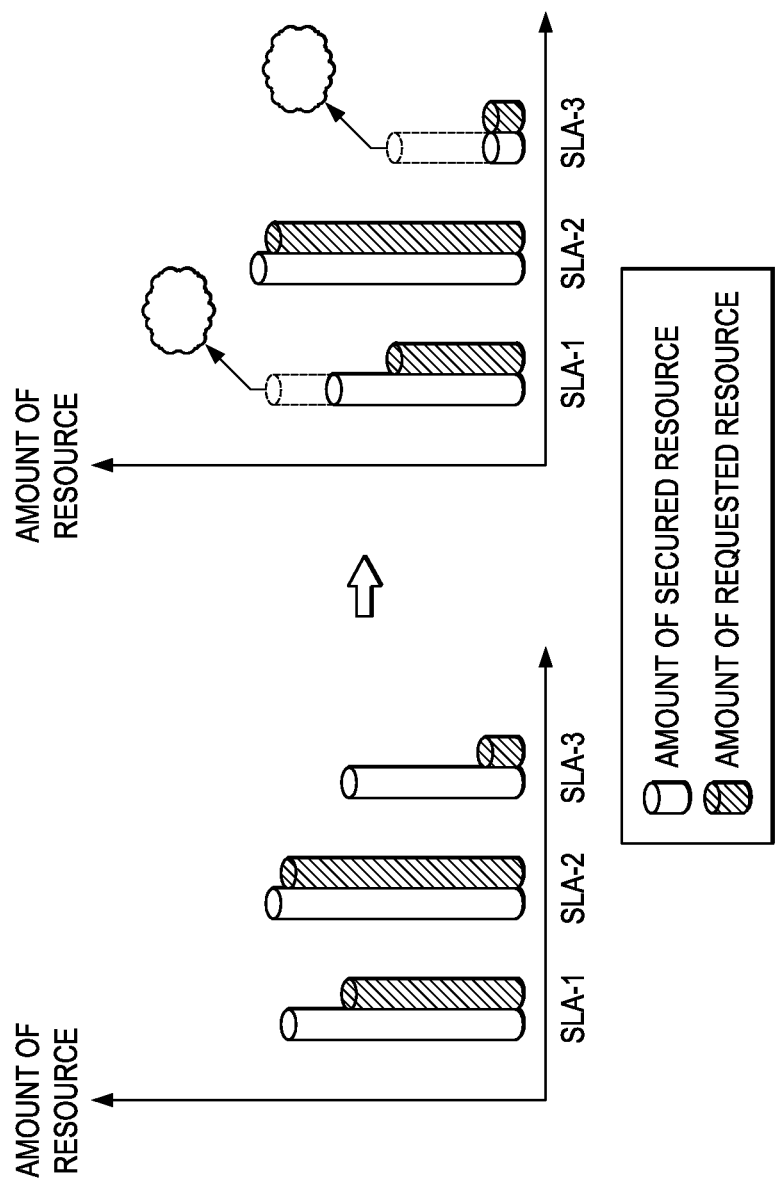
FIG. 14C shows an example of provisioning resources to other clouds according to one illustrative embodiment.

FIG. 14C shows an example of provisioning of resources to other clouds according to one illustrative embodiment. In this case, since the resources corresponding to SLA-1 and SLA-3 fall short, the determining part 220 can determine to secure external resources corresponding to SLA-1 and SLA-3 from the one or more other computer systems 140a-b, i.e., other clouds. That makes the amounts of secured resources exceed the amounts of necessary resources for all of SLA-1 to SLA-3.

Figure 15:
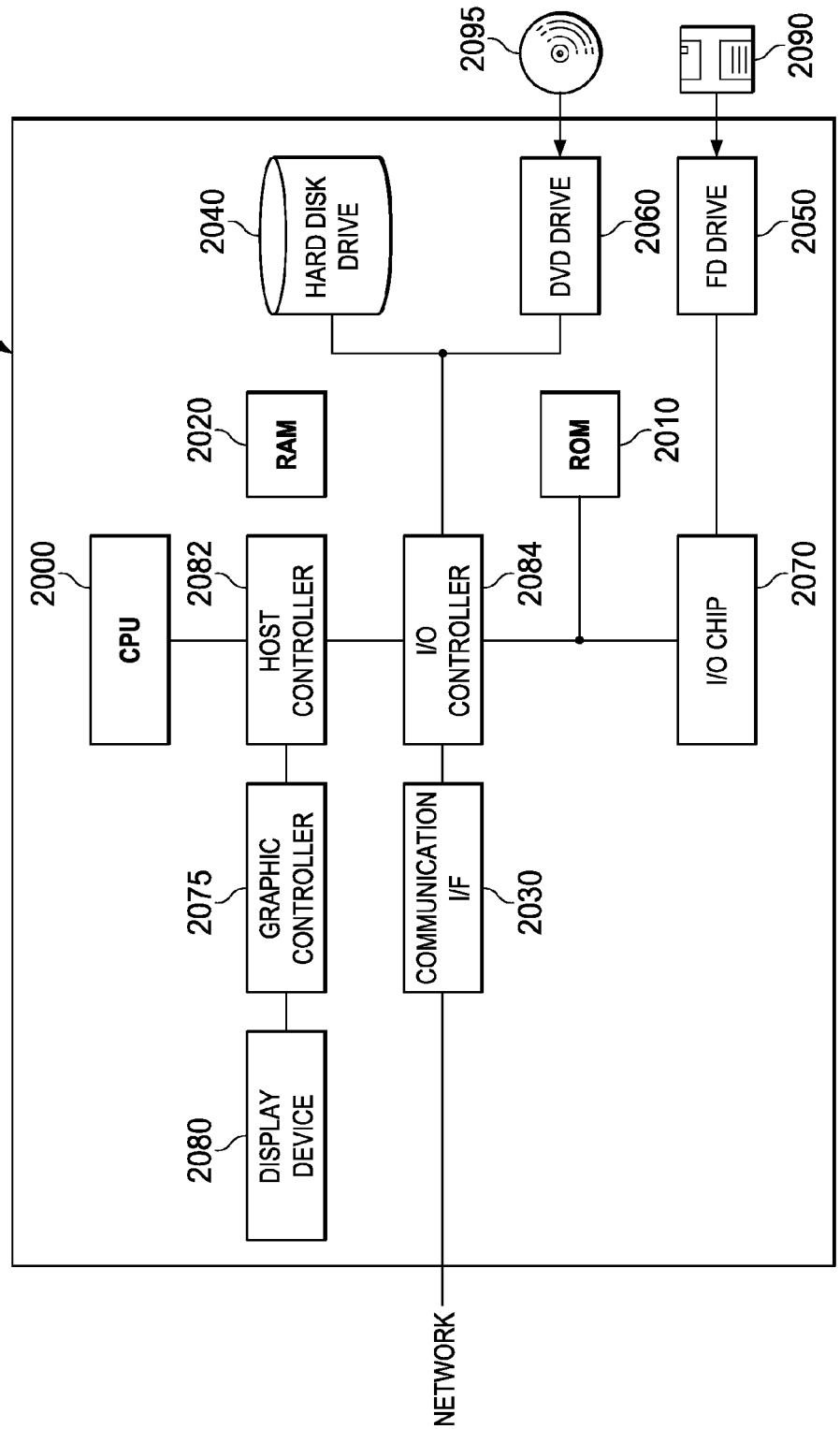
FIG. 15 shows an example of a hardware configuration of a computer according to one illustrative embodiment.

FIG. 15 shows an example of a hardware configuration of a computer 1900 according to one illustrative embodiment. The computer 1900 according to the embodiment includes a CPU peripheral unit having a CPU 2000, a RAM 2020, a graphic controller 2075, and a display device 2080 which are connected to one another via a host controller 2082. The computer 1900 further comprises an Input/Output unit having a communication interface 2030, a hard disk drive 2040, and a DVD drive 2060 which are connected to the host controller 2082 via an Input/Output controller 2084. Furthermore, the computer 1900 comprises a legacy Input/Output unit having a ROM 2010, a flexible disk drive 2050, and an Input/Output chip 2070 which are connected to the Input/Output controller 2084.

The host controller 2082 connects the RAM 2020 to the CPU 2000 that accesses the RAM 2020 at high transfer rate, and the graphic controller 2075. The CPU 2000 operates based on a program product stored in the ROM 2010 and the RAM 2020, controlling each component. The graphic controller 2075 obtains image data generated by the CPU 2000 and so forth on a frame buffer provided in the RAM 2020, and causes it to be displayed on the display device 2080. Alternatively, the graphic controller 2075 may internally include the frame buffer for storing the image data generated by the CPU 2000 and so forth.

The Input/Output controller 2084 connects the host controller 2082 to the communication interface 2030, the hard disk drive 2040, and the DVD drive 2060, which are relatively high-speed input/output devices. The communication interface 2030 communicates with other devices over a network. The hard disk drive 2040 stores programs and data used by the CPU 2000 in the computer 1900. The DVD drive 2060 reads programs or data from a DVD 2095 and provides the programs or data to the hard disk drive 2040 through the RAM 2020.

The ROM 2010, the flexible disk drive 2050, and the Input/Output chip 2070, which are relatively low-speed input/output devices, are connected to the Input/Output controller 2084. The ROM 2010 stores a boot program executed by the computer 1900 at its start, a program product dependent on the hardware of the computer 1900. The flexible disk drive 2050 reads programs or data from a flexible disk 2090 and provides the programs or data to the hard disk drive 2040 through the RAM 2020. The Input/Output chip 2070 connects the flexible disk drive 2050 to the Input/Output controller 2084, and connects the various input/output devices to the Input/Output controller 2084 through, for example, a parallel port, a serial port, a keyboard port, a mouse port, and so forth.

The program product provided for the hard disk drive 2040 through the RAM 2020 are stored in a recording medium such as the flexible disk 2090, the DVD 2095, an IC card or the like, and provided by a user. The programs are read from the recording medium, installed into the hard disk drive 2040 in the computer 1900 through the RAM 2020, and executed in the CPU 2000.

A program product installed in the computer 1900 to allow the computer 1900 to function as the computer system 110 includes a receiving module, a prime contractor DB module, a determining module, an external resource securing module, a cloud DB module, an executing module, an internal resource module, an internal resource securing module, a log recording module, a resource provisioning module, and a subcontractor DB module. The program product, or the modules, execute on the CPU 2000 and allow the computer 1900 to function as the receiving part 210, the prime contractor DB 215, the determining part 220, the external resource securing part 230, the cloud DB 235, the executing part 240, the internal resources 250, the internal resource securing part 260, the log recording part 270, the resource provisioning part 280, and the subcontractor DB 285, respectively.

The information processing described in the programs is read into the computer 1900 and functions as specific means realized by the cooperation of software and the above-mentioned various hardware resources, namely the receiving part 210, the prime contractor DB 215, the determining part 220, the external resource securing part 230, the cloud DB 235, the executing part 240, the internal resources 250, the internal resource securing part 260, the log recording part 270, the resource provisioning part 280, and the subcontractor DB 285. As information computing or processing in accordance with a purpose of use of the computer 1900 in the embodiment is realized by these specific means, the specific computer system 110 in accordance with the purpose of use is constructed.

As an example, when the computer 1900 communicates with an external device or the like, the CPU 2000 executes a communication program loaded on the RAM 2020, and instructs the communication interface 2030 to perform communication processing based on the contents of processing described in the communication program. The communication interface 2030 reads transmission data stored in a transmission buffer area or the like provided in a storage device, such as the RAM 2020, the hard disk drive 2040, the flexible disk 2090, the DVD 2095 or the like, and transmits it to the network, or writes reception data, received from the network, in a reception buffer area or the like provided in the storage device under the control of the CPU 2000. The communication interface 2030 may transfer the transmission/reception data to/from the storage device by the DMA (Direct Memory Access) system, or the CPU 2000 may transfer the transmission/reception data by reading data from the storage device or the communication interface 2030 of the sender, and writing the data in the communication interface 2030 or the storage device of the receiver.

The CPU 2000 allows the entire contents, or a necessary portion of, a file, a database or the like stored in an external storage device, such as the hard disk drive 2040, DVD drive 2060 (DVD 2095), or flexible disk drive 2050 (flexible disk 2090), to be read into the RAM 2020 by DMA transfer or the like, and performs various kinds of processing on the data on the RAM 2020. Then, the CPU 2000 writes processed data back to an external storage device by DMA transfer or the like. Because the RAM 2020 can be regarded to temporarily hold the contents of the external storage device in such processing, the RAM 2020, the external storage device and the like are generally called a memory, a storage part, a storage device or the like in the embodiment. Various kinds of information, such as various programs, data, tables, databases, and the like in the embodiment are stored in such a storage device to be subjected to information processing. The CPU 2000 can hold a part of the RAM 2020 in a cache memory to read and write data therefrom and therein. Because the cache memory serves as a part of the function of the RAM 2020 even in such a mode, the memory is considered to be included in the RAM 2020, memory and/or storage device, unless otherwise specified distinguishably in the embodiment.

The CPU 2000 performs various kinds of processing including various operations, information processing, conditional determination, information retrieval and information substitution, designated by a sequence of commands of a program product and described in the foregoing description of the embodiment, on the data read from the RAM 2020, and writes resultant data back into the RAM 2020. In the case of making a conditional determination, for example, the CPU 2000 determines whether various parameters illustrated in the foregoing description of the embodiment satisfy a condition of being larger, smaller, equal to or greater than, equal to or lower than, or equal to another parameter or another constant, and branches to a different command sequence or calls a sub routine when the condition is satisfied (or is not satisfied).

The CPU 2000 can search for information stored in a file, a database or the like in the storage device. When a plurality of entries, in each of which the attribute value of a first attribute is associated with the attribute value of a second attribute, are stored in a storage device, for example, the CPU 2000 can search for an entry the attribute value of whose first attribute matches with a designated condition from the plurality of entries stored in the storage device, and read the attribute value of the second attribute stored in the entry to acquire the attribute value of the second attribute associated with the first attribute which satisfies the predetermined condition.

The programs or modules described above may be stored in an external storage medium. An optical recording medium, such as DVD or CD, a magnetooptical recording medium, such as MO, a tape medium, a semiconductor memory, such as an IC card can be used as a recording medium in addition to the flexible disk 2090 and the DVD 2095. A storage device, such as a hard disk or RAM, provided in a server system connected to a private communication network or the Internet can be used as a recording medium to provide the computer 1900 with the programs over the network.

Although the present invention has been described above by use of the embodiment, the technical scope of the present invention is not limited to that described in the foregoing embodiment. It is apparent to those skilled in the art that various changes or modifications can be added to the foregoing embodiment. It is apparent from the description of the scope of claims that embodiments to which such changes or modifications are added can also be included in the technical scope of the present invention.

It should be noted that the processes in the operations, procedures, steps, stages or the like in the devices, systems, programs, and methods illustrated in the scope of claims, specification, and drawings can be performed in any order, unless they are especially designated with such terms as 'before' and 'prior to' or the output from the prior process is used in the next process. Even if the operational flow is described in the scope of claims, specification, and drawings by using such terms as 'first' and 'next' for convenience, it does not mean that the operation needs to be performed in the stated order.

What is claimed is:

1. A computer system for executing a process specified by a user and charging the user for the process, comprising:
at least one processor;
a receiving part configured to receive an instruction to execute the specified process and a service level request to be satisfied by a resource which executes the specified process;
a determining part configured to determine an external resource to provision from a first other computer system for a charge;
an external resource securing part configured to secure the external resource on the first other computer system;
an internal resource securing part configured to secure an internal resource of the computer system; and
an executing part configured to cause the external resource to execute at least a part of the specified process and the internal resource to execute the other part of the specified process, wherein the determining part is further configured to:
determine whether or not to execute provisioning to replace an operating system or an application program running on the computer system with another operating system or application program, and
determine resources to secure by the external resource securing part and internal resource securing part which satisfy the service level request and also require a minimum cost of support including a cost required for the provisioning among available resources of the computer system and the first other computer system, as the internal resource and the external resource.

2. The computer system according to claim 1, wherein said determining part changes allocations of the internal resource secured in the computer system and the external resource secured in the first other computer system to increase a profit, wherein the profit is a cost of support for the computer system including a charge billed by the first other computer system subtracted from a charge for the computer system.

3. The computer system according to claim 1, wherein said receiving part receives the service level request including service level specifications corresponding to a plurality of service level items respectively, and said determining part secures resources which satisfy the service level specifications corresponding to the plurality of service level items respectively, the service level items being included in the service level request, and also requires the minimum cost of support among available resources of the computer system and the first other computer system, as the internal resource and the external resource.

4. The computer system according to claim 3, wherein if, among the available resources of the computer system and the first other computer system, the resources at the service levels which are the same levels as those of the specifications of the service levels corresponding to the plurality of service level items respectively, the service level items being included in the service level request, are not sufficient, said determining part secures the resources at a service level higher than the specifications of the service levels of at least one of the internal resource or the external resource.

5. The computer system according to claim 2, wherein said determining part further causes a redundant configuration of two or more resources, each of which does not satisfy availability included in the service level request, among the available resources of the computer system and the first other computer system, to function as a resource that satisfies the availability.

6. The computer system according to claim 2, further comprising:
a log recording part for recording a log of the instructions to execute the specified process which the computer system received, wherein said determining part determines the amount of external resources to provision from the first other computer system based on the log recorded in said log recording part.

7. The computer system according to claim 2, further comprising:
a resource provisioning part for securing a resource of the computer system in response to a request from at least either the first other computer system or a second other computer system, and allows the resource to be used as a resource provisioned and charging for the same.

8. The computer system according to claim 7, wherein said determining part changes a charge to bill for the provisioned resource based on at least either presence/absence of vacancy or a vacant time of the resources of the computer system.

9. The computer system according to claim 2, wherein in response to an event that the profit lowers to a standard proportion of the cost of support or below, wherein the profit is the charge billed by the first computer system subtracted from the charge for the computer system, said determining part raises the charge.

10. A method for executing a process specified by a user, in a computer system, and charging the user for the same, comprising:
receiving, by a receiving part of the computer system, an instruction to execute the specified process and a service level request to be satisfied by a resource which executes the specified process;
determining, by a determining part of the computer system, an external resource to provision from a first other computer system for a charge;
securing, by an external resource securing part of the computer system, the external resource on the first other computer system;
securing, by an internal resource securing part of the computer system, an internal resource of the computer system; and
causing, by an executing part of the computer system, the external resource of the first other computer system to execute at least a part of the specified process and the internal resource to execute the other part of the specified process, wherein:
the determining includes determining whether or not to execute provisioning to replace an operating system or an application program running on the computer system with another operating system or application program, and
determining resources to secure which satisfy the service level request and also require a minimum cost of support including a cost required for provisioning among available resources of the computer system and the first other computer system, as the internal resource and the external resource.

11. A computer program product comprising a non-transitory computer readable medium with instructions which, when executed on a computer, causes the computer to function as a computer system which executes a process specified by a user and charges the user for the same, by:
receiving, by a receiving part of the computer, an instruction to execute the specified process and a service level request to be satisfied by a resource which executes the specified process;

determining, by a determining part of the computer, an external resource to provision from a first other computer system for a charge;

securing, by an external resource securing part of the computer, the external resource on the first other computer system;

securing, by an internal resource securing part of the computer, an internal resource of the computer system; and causing, by an executing part of the computer, the external resource to execute at least a part of the specified process and the internal resource to execute the other part of the specified process, wherein:

the determining includes determining whether or not to execute provisioning to replace an operating system or an application program running on the computer system with another operating system or application program, and determining resources to secure which satisfy the service level request and also require a minimum cost of support including a cost required for provisioning among available resources of the computer system and the first other computer system, as the internal resource and the external resource.

12. The method according to claim 10, wherein said determining comprises changing allocations of the internal resource secured in the computer system and the external resource secured in the first other computer system to increase a profit, wherein the profit is a cost of support for the computer system including a charge billed by the first other computer system subtracted from a charge for the computer system.

13. The method according to claim 10, wherein said receiving comprises receiving the service level request including service level specifications corresponding to a plurality of service level items respectively, and said determining secures resources which satisfy the service level specifications corresponding to the plurality of service level items respectively, the service level items being included in the service level request, and also requires the minimum cost of support among available resources of the computer system and the first other computer system, as the internal resource and the external resource.

14. The method according to claim 13, wherein if, among the available resources of the computer system and the first other computer system, the resources at the service levels which are the same levels as those of the specifications of the service levels corresponding to the plurality of service level items respectively, the service level items being included in the service level request, are not sufficient, said determining comprises securing the resources at a service level higher than the specifications of the service levels of at least one of the internal resource or the external resource.

15. The computer program product according to claim 11, wherein said determining comprises changing allocations of the internal resource secured in the computer system and the external resource secured in the first other computer system to increase a profit, wherein the profit is a cost of support for the computer system including a charge billed by the first other computer system subtracted from a charge for the computer system.

16. The computer program product according to claim 11, wherein said receiving comprises receiving the service level request including service level specifications corresponding to a plurality of service level items respectively, and said determining secures resources which satisfy the service level specifications corresponding to the plurality of service level items respectively, the service level items being included in the service level request, and also requires the minimum cost of support among available resources of the computer system and the first other computer system, as the internal resource and the external resource.

17. The computer program product according to claim 16, wherein if, among the available resources of the computer system and the first other computer system, the resources at the service levels which are the same levels as those of the specifications of the service levels corresponding to the plurality of service level items respectively, the service level items being included in the service level request, are not sufficient, said determining comprises securing the resources at a service level higher than the specifications of the service levels of at least one of the internal resource or the external resource.

* * * * *